United States Patent [19]

Sandkuehler et al.

[11] Patent Number: 4,846,997
[45] Date of Patent: Jul. 11, 1989

[54] STABLE SUSPENSIONS OF SODIUM HYDROGEN CYANAMIDE

[75] Inventors: Peter Sandkuehler, Hilden; Guenter Schenck, Muelheim, both of Fed. Rep. of Germany

[73] Assignee: Henkel Kommanditgesellschaft auf Aktien, Duesseldorf, Fed. Rep. of Germany

[21] Appl. No.: 95,299

[22] Filed: Sep. 10, 1987

[30] Foreign Application Priority Data

Sep. 13, 1986 [DE] Fed. Rep. of Germany ....... 3631199

[51] Int. Cl.⁴ .......................... C01C 3/16; D06L 3/02; C11D 3/395
[52] U.S. Cl. .......................... 252/186.38; 252/186.41; 252/186.43; 252/186.44; 252/102; 252/103; 252/186.29; 423/369
[58] Field of Search .................... 252/186, 38, 186.41, 252/186.43, 186.44, 102; 423/368, 369

[56] References Cited

U.S. PATENT DOCUMENTS

| | | | |
|---|---|---|---|
| 4,025,453 | 5/1977 | Kravetz et al. | 252/102 |
| 4,086,175 | 4/1978 | Kravetz et al. | 252/99 |
| 4,086,177 | 4/1978 | Kubitschek et al. | 252/102 |
| 4,199,466 | 4/1980 | Benson, Jr. | 252/186.38 X |
| 4,559,158 | 12/1985 | Hase et al. | 252/186.38 X |
| 4,595,782 | 6/1986 | Hase et al. | 564/106 |

Primary Examiner—John F. Terapane
Assistant Examiner—Virginia B. Caress
Attorney, Agent, or Firm—Ernest G. Szoke; Wayne C. Jaeschke; Henry E. Millson, Jr.

[57] ABSTRACT

Monosodium cyanamide is suspended in chemically and physically stable form in certain, high-boiling ether alcohols corresponding to the following formula

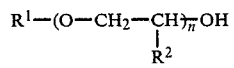

The suspensios are an easy-to-handle, meterable form of NaHNCN in which it may be used both as a starting material for chemical syntheses and as an activator for peroxidic bleaches.

9 Claims, No Drawings

STABLE SUSPENSIONS OF SODIUM HYDROGEN CYANAMIDE

BACKGROUND OF THE INVENTION

1. Field of the Invention

This invention relates to a liquid to pasty preparation of sodium hydrogen cyanamide and certain organic compounds in the form of a suspension. It may be used, inter alia, in the field of oxidative bleaching or as a starting material for chemical synthesis.

2. Discussion of Related Art

Sodium hydrogen cynamide, also known as monosodium cyanamide, is a salt of cyanamide having the formula NaHNCN. It is a colorless solid which is highly hygroscopic and which reacts quickly with the $CO_2$ in the atmosphere. By virtue of its high reactivity to many groups of compounds, NaHNCN is a versatile reagent in chemical syntheses (for example, U.S. Pat. No. 4,595,782) and has also been used as an activator for hydrogen peroxide and derivatives thereof in bleaching processes (U.S. Pat. Nos. 4,025,453; 4,086,175 and 4,086,177).

NaHNCN generally accumulates during its production in the form of a fine powder which is characterized by high dust emission when dry and which, not least because of its sensitivity to $CO_2$ and $H_2O$, is very difficult to handle and can only be accurately metered at considerable cost. Accordingly, there is a need for a form of NaHNCN which is easier to handle and which lends itself better to metering. In particular, there is a need for readily pumpable form of NaHNCN.

Attempts to use NaHNCN in solution failed because this salt, which for the most part is readily soluble only in water and lower alcohols, reacts more or less quickly with these solvents, decomposing in the process.

One possible alterative to using NaHNCN in solution is, in principle, to suspend the salt in liquids in which it is insoluble or only sparingly soluble. However, in this case, too, the high reactivity of the NaHNCN is an obstacle to the chemical stability of the preparations. In addition, suspensions are always likely to be affected by separation problems which, in general, can only be solved by addition of suspension stabilizers. However, the presence of auxiliaries such as these is undesirable for most applications of the preparations.

STATEMENT OF THE INVENTION

In this connection, it has now been found that powder-form sodium hydrogen cyanamide forms stable suspensions with a small group of organic compounds without any need for auxiliaries to be added.

Other than in the operating examples, or where otherwise indicated, all numbers expressing quantities of ingredients or reaction conditions used herein are to be understood as modified in all instances by the term "about".

The present invention relates to suspensions containing from 20 to 70% by weight of NaHNCN, of which more than 90% has a grain size of from 1 to 200 μm, and from 30 to 80% by weight of at least one organic compound corresponding to the following formula

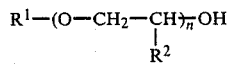

(I)

in which $R^1$ represents hydrogen, a $C_1$–$C_{20}$ alkyl or alkenyl group or a $C_6$–$C_{22}$ phenyl group optionally substituted by one or more alkyl groups, $R^2$ is hydrogen or a methyl group, and n is a number of from 2 to 50, the total number of carbon atoms in the molecule being at least 10.

The new suspensions of NaHNCN show high chemical and physical stability and can be pumped through pipes and thus readily metered at temperatures below 100° C. Handling of the NaHNCN is further facilitated by the fact that, in the form according to the invention, the reaction between atmospheric moisture and/or $CO_2$ in the air and the NaHNCN is decelerated to such an extent that there is generally no need for an inert gas atmosphere. At the same time, however, the desired reactions of the NaHNCN in chemical syntheses and where it is used as a bleach activator are not impaired or are not significantly impaired by the suspension medium. For example, the suspensions of the invention having the same content of NaHNCN can be used in place of the NaHNCN employed in the bleaching processes of U.S. Pat. Nos. 4,025,453; 4,086,175; and 4,086,177.

The NaHNCN suitable for the suspensions according to the invention can be prepared in known manner. It is normally prepared by reaction of cyanamide with sodium hydroxide in aqueous and/or alcoholic solution and rapid isolation of the salt formed by filtration and drying or by concentration through evaporation. Even where technical raw materials are used, the purity of the NaHNCN is regularly above 90%. The usual impurities, such as dicanodiamide and urea for example, do not affect formation of the suspension. NaHNCN generally accumulates during its production as very fine powder which may be directly used as such for the preparation of the suspension. Relatively large agglomerates can be ground beforehand to the desired grain size so that at least 90% by weight of the material has particle sizes of from 1 to 200 μm, preferably from 1 to 100 μm and more preferably from 1 to 50 μm. The quantity of NaHNCN in the suspensions of the invention is from 20 to 70% by weight and preferably from 40 to 65% by weight.

The organic compounds of formula I used as suspension media are polyethylene glycols, polypropylene glycols and mixed polyethylene-polypropylene glycols and monoethers thereof with alcohols or phenols. It is preferred to use polyethylene glycols and monoethers thereof and also polyethylene-polypropylene glycols and monoethers thereof, among which the polyethylene glycols and monoethers thereof, more especially with aliphatic primary or secondary alcohols, are of particular importance. Particularly important are the monoethers formed from primary, preferably unbranched alkanols or alkenols containing from 10 to 18 carbon atoms and polyethylene glycols with n=4–20, preferably 5–15. The boiling points of the suspension media should preferably be above 300° C. at normal pressure.

The suspension media are prepared in known manner by catalyzed polymerization of n moles of ethylene oxide (EO) and/or propylene oxide (PO) in the absence or presence of 1 mole of the etherification component $R^1$—OH. It can also be seen from this preparation reaction why the compounds of formula I are generally present in the form of mixtures and n in this formula is only an average value of various integers from 0 or 1 upwards. The quantity of suspension medium is from 80 to 30% by weight and preferably from 60 to 35% by weight, based on the suspension as a whole.

To prepare the suspension, the powder form monosodium cyanimide is best introduced with vigorous stirring into the liquid suspension medium and stirring continued until the powder has been uniformly dispersed. If necessary, a degassing stage can be added. The suspension may of course also be prepared by other methods. For example, part of the suspension medium or even the entire quantity can be added during the actual preparation of the NaHNCN. It should also be pointed out that the suspension can be prepared both continuously and in batches.

The suspensions of the invention have the property of being pumpable at low temperatures, i.e. at temperatures above about 10° C., more especially above 20° C., and below 100° C., preferably below 70° C. and more preferably below 50° C. In other words, they may be pumped sufficiently quickly through standard pipes without any need to use high-pressure pumps with pumping pressures of generally below 20 bar and more especially below 10 bar. To this end, viscosity may of course be influenced through the choice of the suspension medium and through the quantitative composition of the suspension. In addition, standard flow promoters and viscosity regulators, for example pyrogenic silica can also be added.

The suspensions show extremely high chemical and physical stability. Both properties may be determined by analysis of the NaHNCN content after various periods of storage, either the entire stored sample or individual layers of the sample stored without agitation being analyzed. One method of anaylsis is described in the Example. The physical stability of the suspensions can also be assessed on a semi-quantitative basis by visual examination of samples stored without agitation. Of interest in this respect is, above all, the minimal tendency towards sedimentation at temperatures above the melting point of the suspension medium and more especially at temperatures at which the suspensions can be pumped.

Where sedimentation behaviour is visually assessed on a points scale of 0 (=unchanged) to 3 (=an upper layer is free from solids), the suspensions according to the invention are marked no worse than 1 (=slight sedimentation discernible) after storage for 5 days. The NaHNCN content has decreased by, in all, no more than 15% by weight and more especially by no more than 5% by weight.

The invention will be illustrated but not limited by the following examples.

EXAMPLES

1. Preparation of NaHNCN

A 50% solution of cyanamide in water was stirred while cooling with a stoichiometric quantity of 50% sodium hydroxide and delivered continuously to a thin-layer evaporator operated under a vacuum. NaHNCN accumulated at the solids outlet of the evaporator in the form of a fine, dry powder which could be directly used as such for the preparation of the suspensions.

2. Determination of NaHNCN

The sample to be tested containing approximately 20 mg NaHNCN was introduced into 50 ml of a solvent mixture and immediately titrated with 0.1N AGNO$_3$. In this method, Ag$_2$NCN is precipitated; and the end point clearly determined by potentiometry using a silver electrode. 1 ml of the AgNO$_3$ solution corresponds to 3.20 mg of NaHNCN.

The solvent mixture had the following composition:
660 ml H$_2$O
330 ml ethanol
5 g NH$_3$ (25% solution)
0.5 g NaOH 3. Preparation of An NaHNCN Suspension 20 g of Dehydol 04 (adduct of n-octanol and 4 moles ethylene oxide (EO), a product of Henkel KGaA) was introduced at room temperature into a glass beaker and mixed, initially by hand, with 32 g of sodium hydrogen cyanamide from Example 1. The mixture was then homogenized for 10 minutes using a high-speed stirrer of the Ultra-Turrax type. A suspension pourable at room temperature was formed with slight heating. To test stability, the suspension was divided between two glass bottles and stored in that form without agitation at 25° C. The sedimentation behaviour was visually assessed from one of the two bottles. The assessment was made on a points scale extending from 0 (=unchanged) to 3 (=an upper layer is free from solids). A sample was periodically taken (after uniform mixing) from the second bottle and the NaHNCN content therein was determined.

After storage for 20 days and 60 days, neither bottle showed any evidence of change in relation to the unstored samples.

4. Preparation of Further NaHNCN Suspensions

Stable suspensions were prepared as in Example 3 using spraydried NaHNCN (mean grain size 10 μm) and other suspension media. In some cases, a homogenizer of the Dispermat type manufactured by H. Getzmann, Heiligenhaus, Federal Republic of Germany (H) was used instead of the Ultra-Turrax stirrer of the individual suspensions 4a to 4i. Table 2 shows stability data, stability being tested under the same condition as in Example 3.

For comparison, suspensions of NaHNCN in various other organic liquids were prepared in the same way and assessed (nos. 4k to 4o). None of these suspensions proved to be sufficiently stable. After a short while, the salt sedimented from the mixture or chemical reaction occurred (4n).

TABLE 1

| Example no. | Suspension medium type | quantity g | NaHNCN quantity g | Stirrer | Stirring time mins. | Temperature °C. |
|---|---|---|---|---|---|---|
| 3 | C$_8$ fatty alcohol + 4 EO | 20 | 32 | U | 10 | 35 |
| 4 a | C$_{12}$–C$_{14}$ fatty alcohol + 3 EO | 30 | 47 | U | 10 | 27 |
| 4 b | C$_{12}$–C$_{18}$ fatty alcohol + 6 EO | 20 | 20 | U | 8 | 32 |
| 4 c | sec.-tri-decanol + 8 EO | 151 | 75 | U | 10 | 31 |
| 4 d | C$_{13}$–C$_{15}$ oxo- | 145 | 85 | H | 10 | 29 |

TABLE 1-continued

| Example no. | Suspension medium type | quantity g | NaHNCN quantity g | Stirrer | Stirring time mins. | Temperature °C. |
|---|---|---|---|---|---|---|
| 4 e | alcohol + 7 EO nonylphenol + 15 EO | 30 | 20 | H | 5 | 24 |
| 4 f | polyethylene glycol (MW 200) | 100 | 25 | U | 20 | 30 |
| 4 g | polyethylene glycol (MW 600) | 100 | 26 | U | 20 | 33 |
| 4 h | polyethylene-polypropylene glycol (10% EO, MW 4500) | 100 | 40 | U | 10 | 32 |
| 4 i | polyethylene-polypropylene glycol (20% EO, MW 2500) | 100 | 50 | U | 10 | 29 |
| 4 k | petrol (Bp. 80–100° C.) | 17 | 35 | U | 7 | 28 |
| 4 l | ethyl acetate | 18 | 25 | U | 5 | 24 |
| 4 m | acetonitrile | 16 | 29.5 | U | 11 | 24 |
| 4 n | glycerol | 30 | 3 | H | 5 | 50 |
| 4 o | xylene | 20 | 13.5 | H | 4 | 24 |

TABLE 2

| Example no. | NaHNCN content (% by weight) after storage for | | | | Evaluation of physical stability after | | |
|---|---|---|---|---|---|---|---|
| | 0 days | 5 days | 20 days | 60 days | 5 days | 20 days | 60 days |
| 3 | 61.5 | 61.5 | 61.5 | 61.5 | 0 | 0 | 0 |
| 4 a | 61.0 | 61.0 | 61.0 | 61.0 | 0 | 0 | 0 |
| 4 c | 33.2 | 32.2 | 31.9 | 30.4 | 0 | 0 | 1 |
| 4 e | 40.0 | 40.0 | 40.0 | 40.0 | 0 | 0 | 0–1 |
| 4 f | 20.0 | 19.0 | 19.0 | 18.7 | 0 | 0–1 | 0–1 |
| 4 g | 20.6 | 19.2 | 19.0 | 18.9 | 0 | 0–1 | 0–1 |
| 4 h | 28.6 | 25.4 | 25.2 | 24.4 | 0 | 0 | 0–1 |
| 4 i | 33.3 | 29.7 | 28.9 | 27.5 | 0 | 1 | 1 |
| 4 k | 67.3 | | | | 3 | | |
| 4 l | 58.1 | | | | 3 | | |
| 4 m | 64.8 | | | | 3 | | |
| 4 n | 9.1 decomposition | | | | dissolved | | |
| 4 o | 40.3 | | | | 3 | | |

We claim:

1. A suspension consiting essentially of from about 20 to about 70% by weight of NaHNCN of which more than about 90% has a grain size of from about 1 to about 200 μm, and from about 30 to about 80% by weight of at least one liquid organic compound of the formula

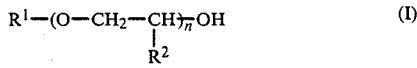

$$R^1-(O-CH_2-CH)_{\overline{n}}OH \quad\quad (I)$$
$$\phantom{R^1-(O-CH_2-CH)_{\overline{n}}O}R^2$$

in which $R^1$ is hydrogen, a $C_1$–$C_{20}$ alkyl or alkenyl group, or a $C_6$–$C_{22}$ phenyl group optionally substituted by one or more alkyl groups; $R^2$ is hydrogen or a methyl group, and n is a number from 2 to 50; the total number of carbon atoms in the molecule being at least 10.

2. The suspension of claim 1 wherein from about 40 to about 65% by weight of NaHNCN and from about 35 to about 60% by weight of the organic compound of formula I are present therein.

3. The suspension of claim 1 wherein more than about 90% by weight of the NaHNCN has a grain size of from about 1 to about 100 μm.

4. The suspension of claim 3 wherein the grain size is from about 1 to about 50 μm.

5. The suspension of claim 1 wherein the organic compound of formula I is one or more of a polyethylene glycol, a monoalkyl or monophenyl ether thereof, a polyethylene-polypropylene glycol, or a monoalkyl or monophenyl ether thereof.

6. The suspension of claim 1 wherein the organic compound of formula I is one or more of a polyethylene glycol, or a monoether thereof with an aliphatic, primary or secondary alcohol.

7. The suspension of claim 1 wherein the organic compound of formula I is an adduct of from 4 to 20 moles of ethylene oxide and 1 mole of a primary $C_{10}$–$C_{18}$ alkanol.

8. The suspension of claim 7 wherein the primary $C_{10}$–$C_{18}$ alkanol is unbranched.

9. A method of activating bleach in a peroxide-containing detergent comprising adding thereto a bleach activating quantity of the suspension of claim 1.

* * * * *